US012661286B2

(12) United States Patent
Cutler et al.

(10) Patent No.: US 12,661,286 B2
(45) Date of Patent: Jun. 23, 2026

(54) PATIENT SUPPORT APPARATUS HAVING A SKIRT BARRIER

(71) Applicant: Stryker Corporation, Kalamazoo, MI (US)

(72) Inventors: Matthew A. Cutler, Portage, MI (US); Steven L. Birman, Kalamazoo, MI (US); Travis Jay Bradstreet, Chesterfield, MI (US); James Hunt, Topeka, KS (US)

(73) Assignee: Stryker Corporation, Portage, MI (US)

( * ) Notice: Subject to any disclaimer, the term of this patent is extended or adjusted under 35 U.S.C. 154(b) by 210 days.

(21) Appl. No.: 18/384,408

(22) Filed: Oct. 27, 2023

(65) Prior Publication Data

US 2024/0139050 A1 May 2, 2024

Related U.S. Application Data

(60) Provisional application No. 63/419,754, filed on Oct. 27, 2022.

(51) Int. Cl.
*A61G 7/05* (2006.01)
*A61G 7/012* (2006.01)

(52) U.S. Cl.
CPC ............ *A61G 7/0516* (2016.11); *A61G 7/012* (2013.01); *A61G 7/0528* (2016.11)

(58) Field of Classification Search
CPC .......... A61G 7/00; A61G 7/05; A61G 7/0516; A61G 7/012; A61G 7/0528
See application file for complete search history.

(56) References Cited

U.S. PATENT DOCUMENTS 4,654,903 A * 4/1987 Chubb ................. A61G 7/1032 5/607
5,687,437 A * 11/1997 Goldsmith ........... A47C 19/045 5/613
6,321,878 B1 * 11/2001 Mobley ............... B60B 33/0057 188/1.12

(Continued)

FOREIGN PATENT DOCUMENTS

WO 2021108377 A1 6/2021
WO 2021138176 A1 7/2021
WO 2021242946 A1 12/2021

*Primary Examiner* — Fredrick C Conley
(74) *Attorney, Agent, or Firm* — Howard & Howard Attorneys PLLC

(57) ABSTRACT

A patient support apparatus for use in treating patients with behavioral health indicia, including a base supporting wheels for movement along a floor surface, a litter for supporting a patient, and a lift mechanism to move the litter relative to the base between a lowered position and a raised position. A skirt barrier having a bottom edge defining a periphery is operatively attached to the litter for concurrent movement with the litter between an exposed configuration and a shield configuration. The exposed configuration corresponds to the raised position and is defined with the bottom edge spaced vertically above the base. The shield configuration corresponds to the lowered position and is defined with the bottom edge arranged adjacent to the floor surface and with the periphery extending around the base to at least partially limit external access to the base.

20 Claims, 18 Drawing Sheets

(56) References Cited

U.S. PATENT DOCUMENTS

| | | | | |
|---|---|---|---|---|
| 6,615,426 | B1 * | 9/2003 | Risk, Jr. | A61G 7/0522 5/663 |
| 7,690,059 | B2 * | 4/2010 | Lemire | A61G 7/005 5/616 |
| 10,172,753 | B2 | 1/2019 | Tessmer et al. | |
| 10,806,653 | B2 | 10/2020 | Upchurch et al. | |
| 12,053,423 | B2 * | 8/2024 | Baker, Jr. | A61G 7/0528 |
| 2021/0030611 | A1 | 2/2021 | Shiery et al. | |
| 2021/0338504 | A1 | 11/2021 | Childs et al. | |

* cited by examiner

PATIENT SUPPORT APPARATUS HAVING A SKIRT BARRIER

CROSS-REFERENCE TO RELATED APPLICATION

The subject patent application claims priority to and all the benefits of U.S. Provisional Patent Application No. 63/419,754 filed on Oct. 27, 2022, the disclosure of which is hereby incorporated by reference in its entirety.

BACKGROUND

Patient support apparatuses, such as hospital beds, stretchers, cots, tables, wheelchairs, and chairs are used to help caregivers facilitate care of patients in a health care setting. Conventional patient support apparat-uses generally comprise a base and a patient support surface upon which the patient is supported. Often, these patient support apparatuses have one or more movable components, such as side rails that can be moved between raised and lowered positions, deck sections which articulate to adjust the patient support surface to support the patient between different patient support configurations, as well as lift mechanisms that adjust the height of the patient support surface.

In some environments, certain patients may present various forms of behavioral health indicia which can be associated with a potential risk of self-harm. Here, patients may sometimes attempt to inflict harm on themselves using components or portions of the patient support apparatus, including components arranged on the base. Certain patients may also attempt to tamper with components or portions of the patient support apparatus.

There remains a need in the art to address one or more of the challenges outlined above.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
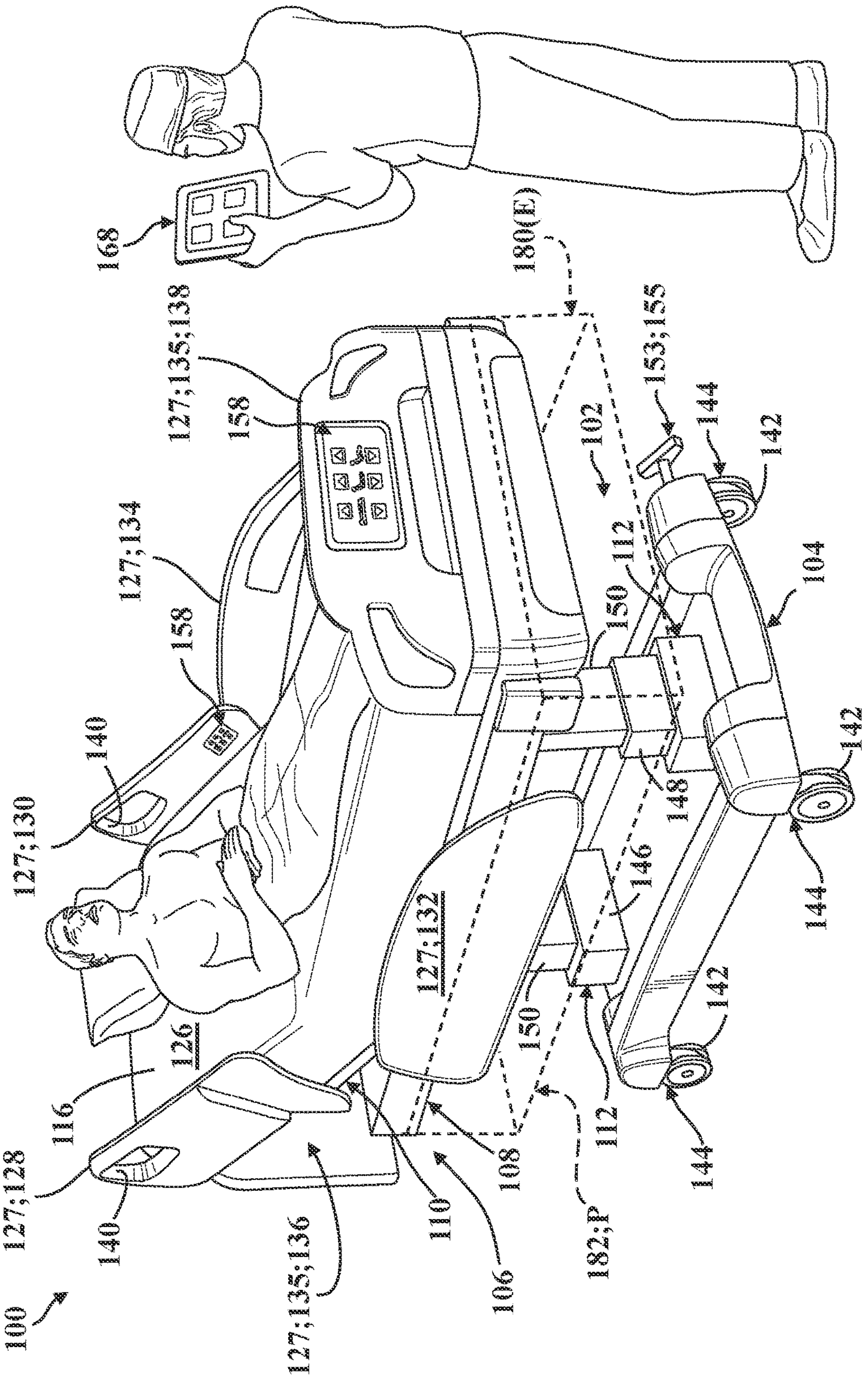
FIG. 1 is perspective view of a patient support apparatus shown having a base, a litter with a patient support deck, a lift mechanism, side rails, and a skirt barrier, with the skirt barrier depicted in phantom.

Referring to FIGS. 1 and 3A-6, a patient support apparatus 100 is shown for supporting a patient in a health care setting. The patient support apparatus 100 illustrated throughout the drawings is realized as a hospital bed. In other versions, however, the patient support apparatus 100 may be a stretcher, a cot, a table, a wheelchair, a chair, or a similar apparatus utilized in the care of a patient.

A support structure 102 provides support for the patient. In the representative version illustrated herein, the support structure 102 generally comprises a base 104 and a litter 106. Here, the litter 106 includes an intermediate frame 108 and a patient support deck 110 spaced above the base 104. As is described in greater detail below, a lift mechanism 112 is interposed between the base 104 and the intermediate frame 108 to facilitate moving the litter 106 relative to the base 104 between a plurality of vertical positions or configurations, including without limitation one or more raised positions 106A (see FIGS. 3A-4A, 7A, 8, and 12), lowered positions 106B (see FIGS. 4B-5, 9, and 13), intermediate positions (not shown), and/or inclined positions 106C (see FIG. 6) such as a Trendelenburg positions (not shown in detail).

The patient support deck 110 has at least one deck section 114 arranged for movement relative to the intermediate frame 108 between a plurality of section positions 114A, 114B. The deck sections 114 of the patient support deck 110 provide a patient support surface 116 upon which the patient is supported. More specifically, in the representative version of the patient support apparatus 100 illustrated herein, the patient support deck 110 has four deck sections 114 which cooperate to define the patient support surface 116: a back section 118, a seat section 120, a leg section 122, and a foot section 124 (see FIGS. 3A-6). In the representative version illustrated herein, the seat section 120 is fixed to the intermediate frame 108 and is not arranged for movement relative thereto. However, it will be appreciated that the seat section 120 could be movable relative to other deck sections 114 in some versions. Conversely, the back section 118 and the leg section 122 are arranged for independent movement relative to each other and to the intermediate frame 108, as described in greater detail below, and the foot section 124 is arranged to move partially concurrently with the leg section 122. Other configurations are contemplated, and it will be appreciated that different arrangements of deck sections 114 are contemplated by the present disclosure. By way of non-limiting example, the patient support deck 110 could be configured without a discrete seat section 120 in some versions. Furthermore, while the representative version of the litter 106 illustrated herein employs the intermediate frame 108 to support the deck sections 114 of the patient support deck 110 for movement relative to the base 104 via the lift mechanism 112, it will be appreciated that various types of litters 106, with or without discrete intermediate frames 108 and/or with a differently configured lift mechanism 112, are contemplated by the present disclosure.

A mattress 126 is disposed on the patient support deck 110 during use. The mattress 126 comprises or otherwise defines the patient support surface 116 upon which the patient is supported, but it will be appreciated that its shape is defined based on the arrangement of the patient support deck 110. Here too, it will be appreciated that the patient support deck 110 itself would define the patient support surface 116 during operation of some versions of the patient support apparatus 100 without the mattress 126. Put differently, the mattress 126 may be omitted in certain versions, such that the patient can rest directly on the patient support surface 116 defined by the deck sections 114 of the patient support deck 110. The base 104, the litter 106, the intermediate frame 108, and the patient support deck 110 each have a head end and a foot end corresponding to designated placement of the patient's head and feet on the patient support apparatus 100. It will be appreciated that the specific configuration of the support structure 102 may take on any known or conventional design, and is not limited to that specifically illustrated and described herein. Other configurations are contemplated.

Figure 3A:
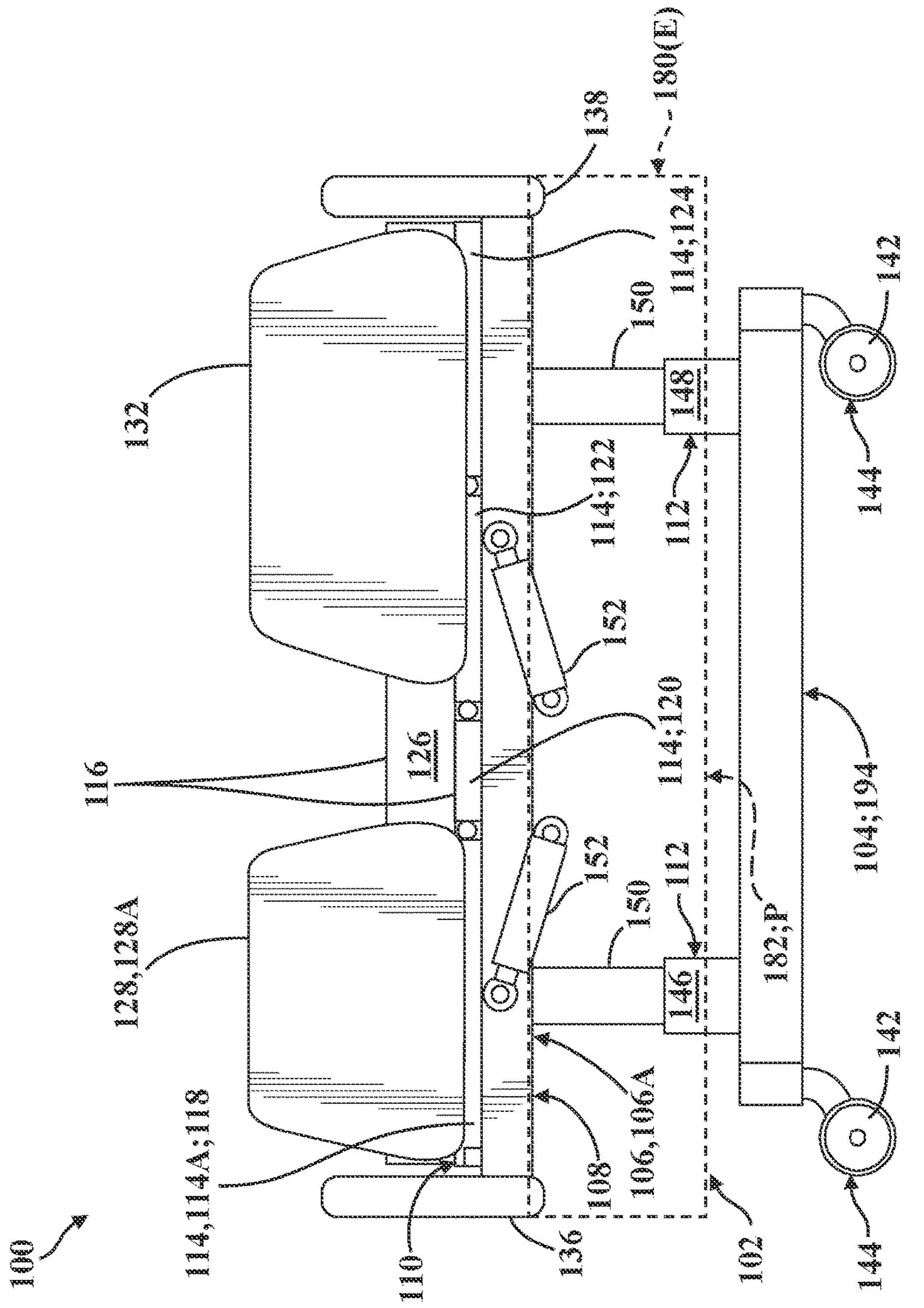
FIG. 3A is a schematic left-side view of the patient support apparatus of FIG. 1, shown with each of the side rails arranged in a raised position.
Figure 3B:
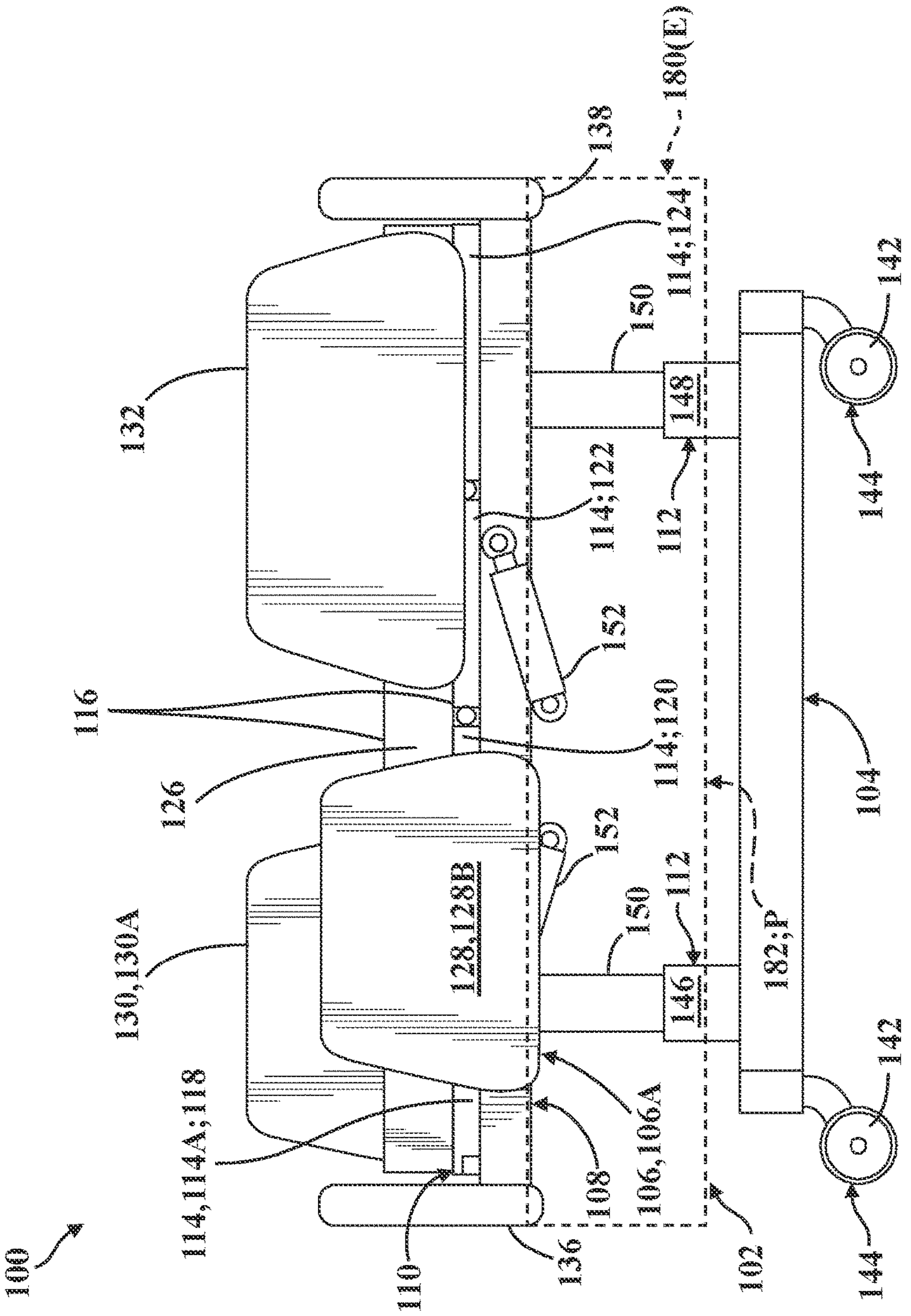
FIG. 3B is another schematic left-side view of the patient support apparatus of FIG. 3A, shown with a first side rail arranged in an intermediate position, and shown with a second side rail arranged in the raised position.
Figure 3C:
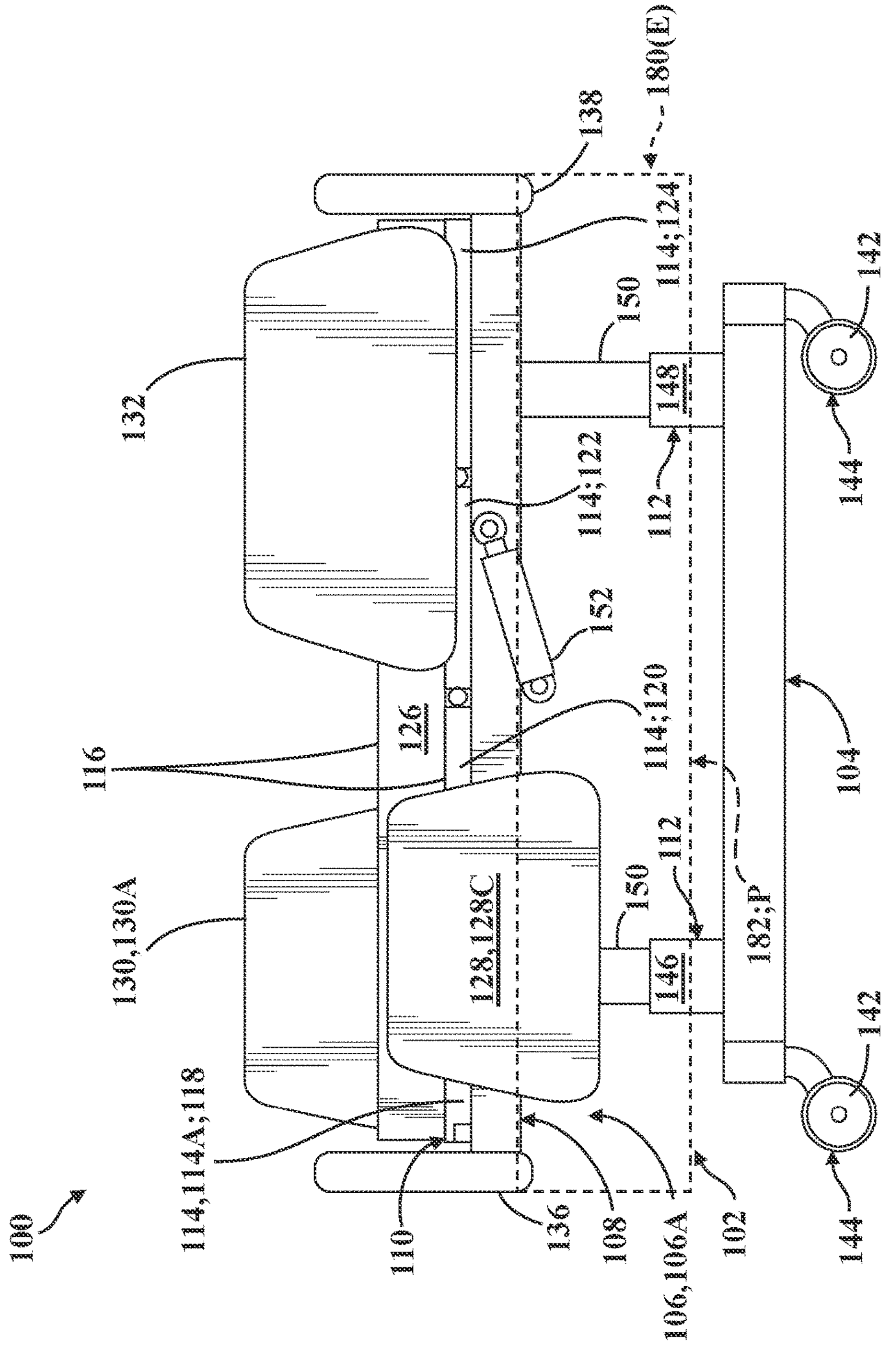
FIG. 3C is another schematic left-side view of the patient support apparatus of FIGS. 3A-3B, shown with the first side rail arranged in a lowered position.

The Side rails 128, 130, 132, 134 are supported for movement relative to the intermediate frame 108 (and, thus, relative to the base 104). A first side rail 128 is positioned at a right head end of the litter 106. A second side rail 130 is positioned at a left head end of litter 106. A third side rail 132 is positioned at a right foot end of the litter 106. A fourth side rail 134 is positioned at a left foot end of the litter 106. As shown in FIGS. 3A-3C, one or more of the side rails may be movable between a plurality of side rail positions, including a raised position 128A, 130A in which they block ingress and egress into and out of the patient support apparatus 100 (see FIG. 3A), one or more intermediate positions 128B, 130B (see FIG. 3B), and a lowered position 128C, 130C (see FIG. 3C) in which they are not an obstacle to such ingress and egress onto or off of the patient support surface 116. It will be appreciated that there may be fewer side rails for certain versions, such as where the patient support apparatus 100 is realized as a stretcher or a cot. In some versions, the side rails 128, 130, 132, 134 or other portions of the patient support apparatus 100 may be similar to as is described in U.S. Patent Application Publication No. US 2021/0338504 A1, entitled "Side Rail Assembly For A Patient Support Apparatus," the disclosure of which is hereby incorporated by reference in its entirety. Other configurations are contemplated. In the representative version illustrated herein, the first and second side rails 128, 130 are coupled to the back section 118 of the patient support deck 110 and move concurrently therewith (connection not shown in detail; see FIGS. 7A-7B). In FIGS. 4A-6, which each depict left-side views of the patient support apparatus 100, the first and third side rails 128, 132 are omitted for illustrative purposes.

As shown in FIGS. 1 and 3A-6, a headboard 136 and a footboard 138 are coupled to the intermediate frame 108 of the litter 106. However, it will be appreciated that the headboard 136 and/or footboard 138 may be coupled to other locations on the patient support apparatus 100, such as the base 104, or may be omitted in certain versions. One or more caregiver interfaces 140, such as handles, are shown in FIG. 1 as being integrated into the first and second side rails 128, 130 to facilitate movement of the patient support apparatus 100 over floor surfaces FS. Additional caregiver interfaces 140 may be integrated into the headboard 136, the footboard 138, and/or other components of the patient support apparatus 100, such as the third and/or fourth side rails 132, 134, the intermediate frame 108, and the like. The caregiver interfaces 140 are shaped so as to be grasped by a caregiver as a way to position or otherwise manipulate the patient support apparatus 100 for movement. It will be appreciated that the caregiver interfaces 140 could be integrated with or operatively attached to any suitable portion of the patient support apparatus 100, or may be omitted in certain versions.

Wheels 142 are coupled to the base 104 to facilitate transportation over floor surfaces FS. The wheels 142 are arranged in each of four quadrants of the base 104, adjacent to corners of the base 104. In the version shown in FIG. 1, the wheels 142 form part of respective caster wheel assemblies 144 mounted to the base 104 and configured to enable the wheels 142 to rotate and swivel relative to the support structure 102 during transport. In the illustrated version, the patient support apparatus 100 includes a brake assembly 153 supported by the base 104, operatively attached to one or more of the wheels 142, and being operable between a braked state 153B to inhibit movement of the base 104 about floor surfaces FS, and an unbraked state 153U to permit movement of the base 104 about floor surfaces FS (see FIGS. 8-9; not shown in detail). In some versions, the brake assembly 153 includes a brake pedal 155 (e.g., a foot pedal) operatively attached to the base 104 and arranged for user engagement to operate the brake assembly 153 between the braked state 153B and the unbraked state 153U. In some versions, the brake assembly 153 may be similar to as is disclosed in U.S. Pat. No. 10,806,653, entitled "Patient Transport Apparatus With Electro-Mechanical Braking System," and/or International Patent Application Publication No. WO 2021/138176 A1, entitled "Patient Transport Apparatus With Electro-Mechanical Braking System," the disclosures of each of which are hereby incorporated by reference in their entirety. Other configurations are contemplated.

It should be understood that various configurations of the caster assemblies 144 are contemplated. In addition, in some versions, the wheels 142 are not caster wheels. Moreover, it will be appreciated that the wheels 142 may be non-steerable, steerable, non-powered, powered, or combinations thereof. While the representative version of the patient support apparatus 100 illustrated herein employs four wheels 142, additional wheels are also contemplated. For example, the patient support apparatus 100 may comprise four non-powered, non-steerable wheels, along with one or more additional powered wheels. In some cases, the patient support apparatus may not include any wheels. In other versions, one or more auxiliary wheels (powered or non-powered), which are movable between stowed positions and deployed positions, may be coupled to the support structure 102. In some cases, when auxiliary wheels are located between caster assemblies 144 and contact the floor surface FS in the deployed position, they cause two of the caster assemblies 144 to be lifted off the floor surface FS, thereby shortening a wheel base of the patient support apparatus 100. A fifth wheel may also be arranged substantially in a center of the base 104.

Figure 4A:
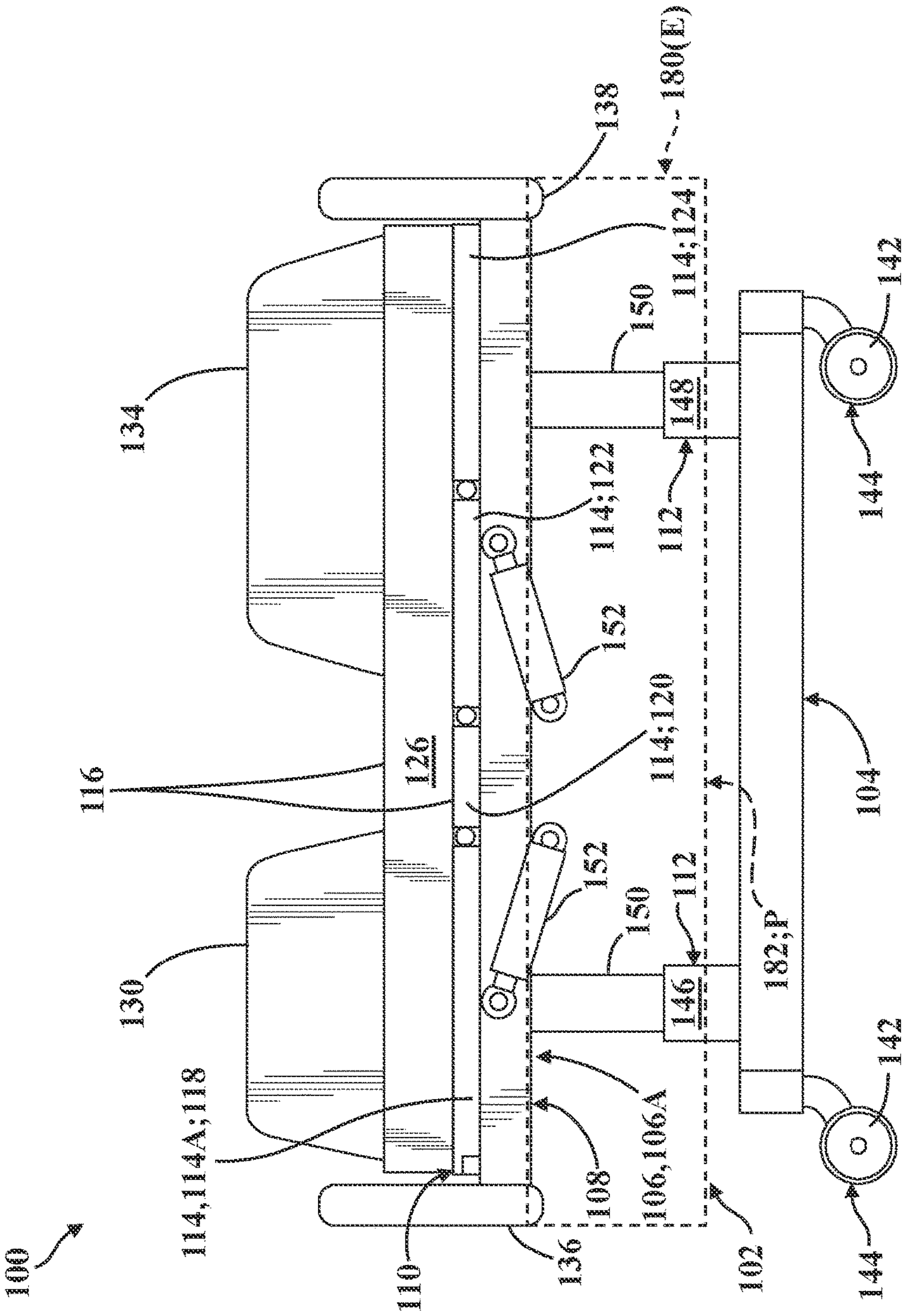
FIG. 4A is another schematic left-side view of the patient support apparatus of FIGS. 3A-3C, shown with two of the side rails removed for illustrative purpose, and with the lift mechanism supporting the litter in a raised position.
Figure 4B:
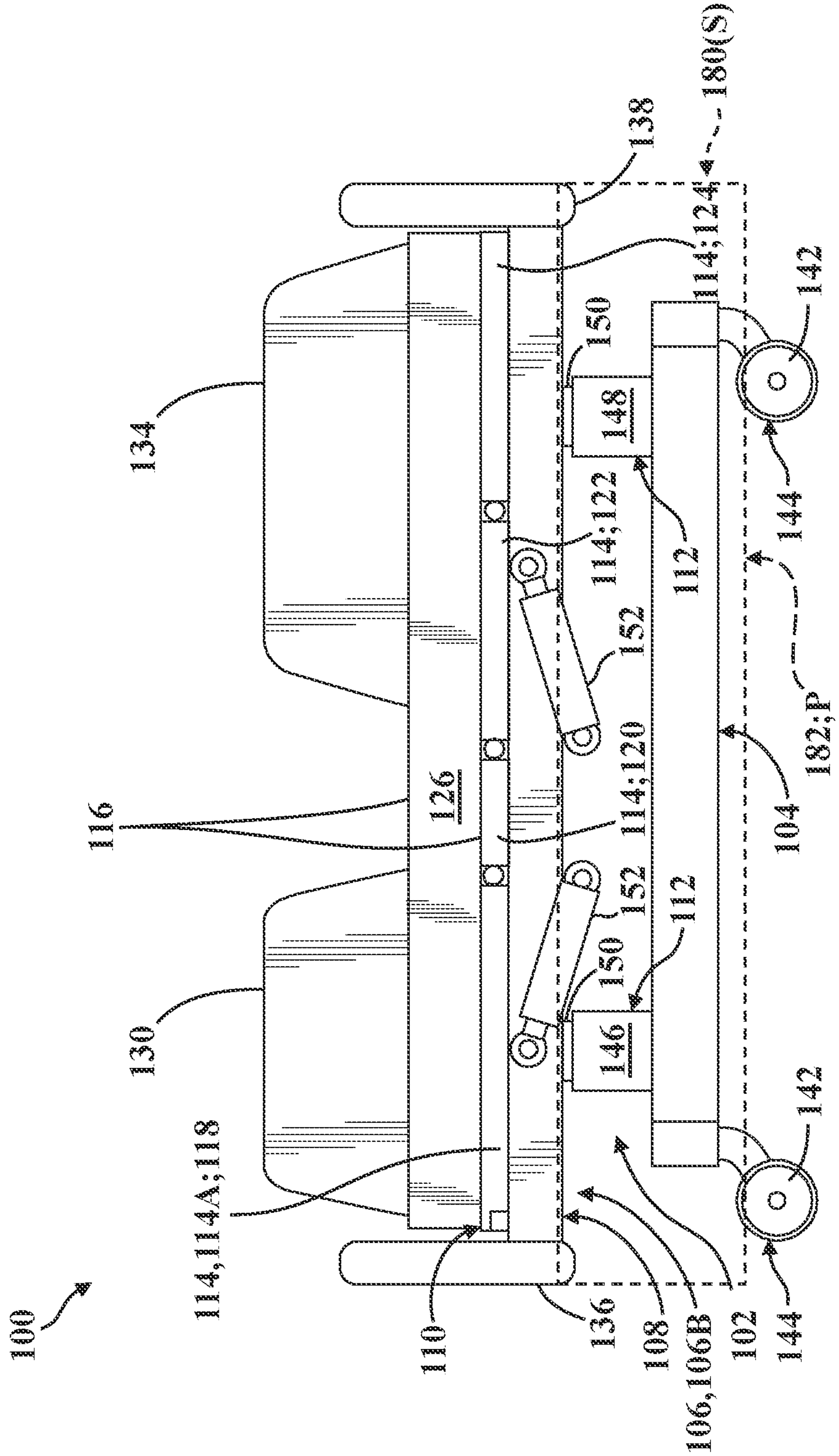
FIG. 4B is another schematic left-side view of the patient support apparatus of FIG. 4A, shown with the lift mechanism supporting the litter in a lowered position.
Figure 5:
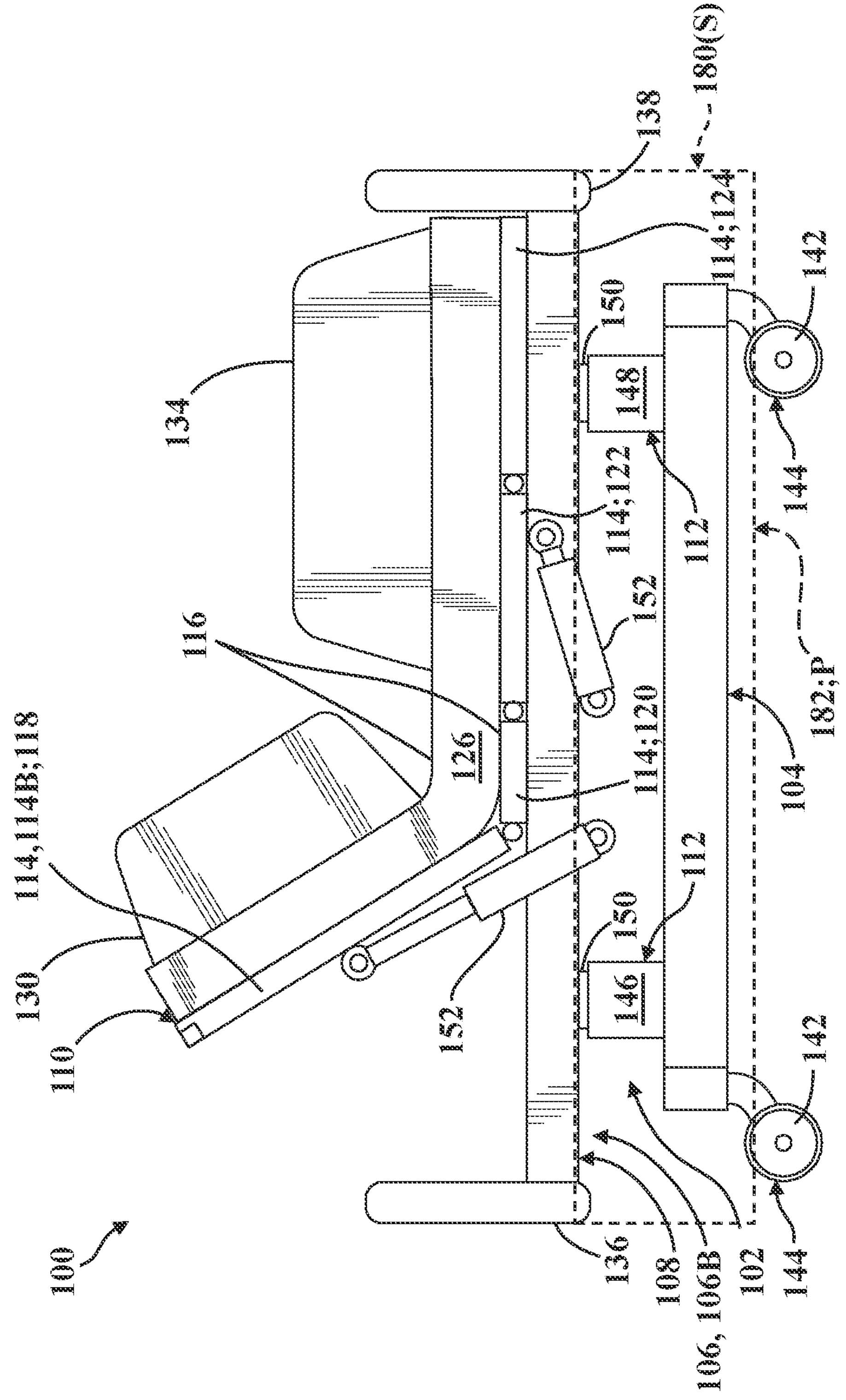
FIG. 5 is another schematic left-side view of the patient support apparatus of FIG. 4B, shown with the patient support deck having a back section arranged in a fowler's position with the second side rail coupled to the back section.
Figure 6:
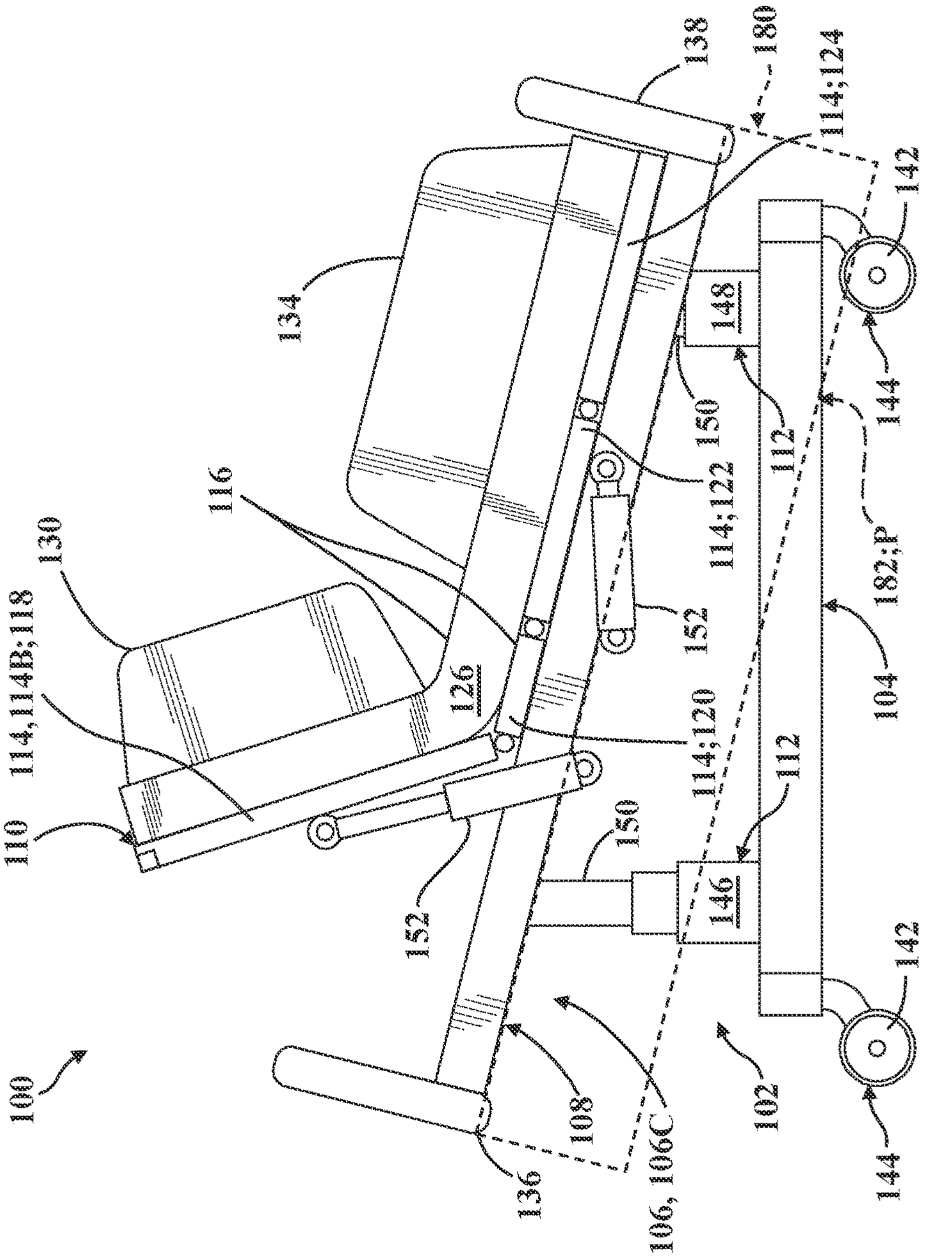
FIG. 6 is another schematic left-side view of the patient support apparatus of FIG. 5, shown with the lift mechanism supporting the litter in an inclined configuration.
Figure 7A:
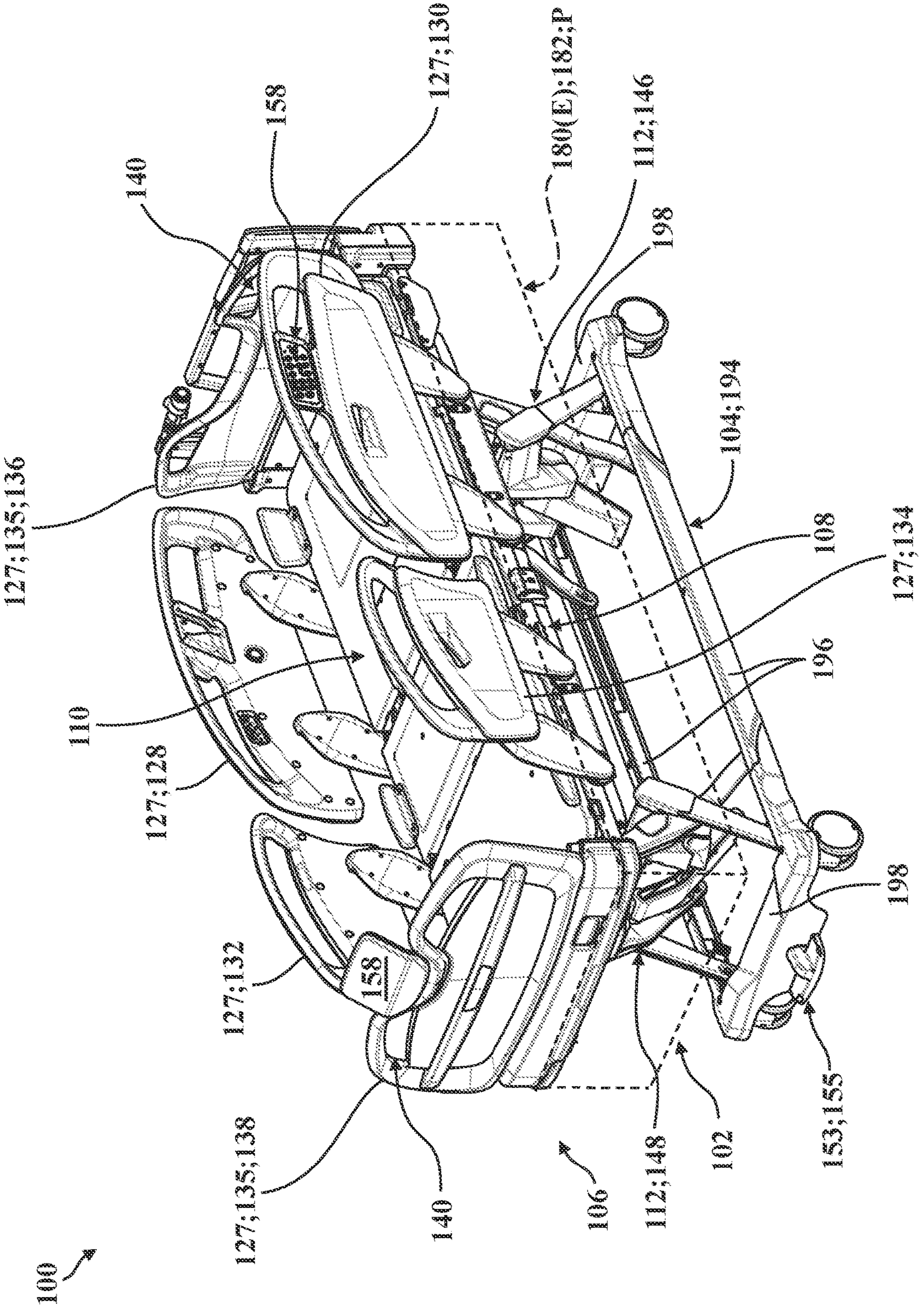
FIG. 7A is a perspective view of another version of the patient support apparatus of FIGS. 1-6, shown having a skirt barrier depicted in phantom.
Figure 7B:
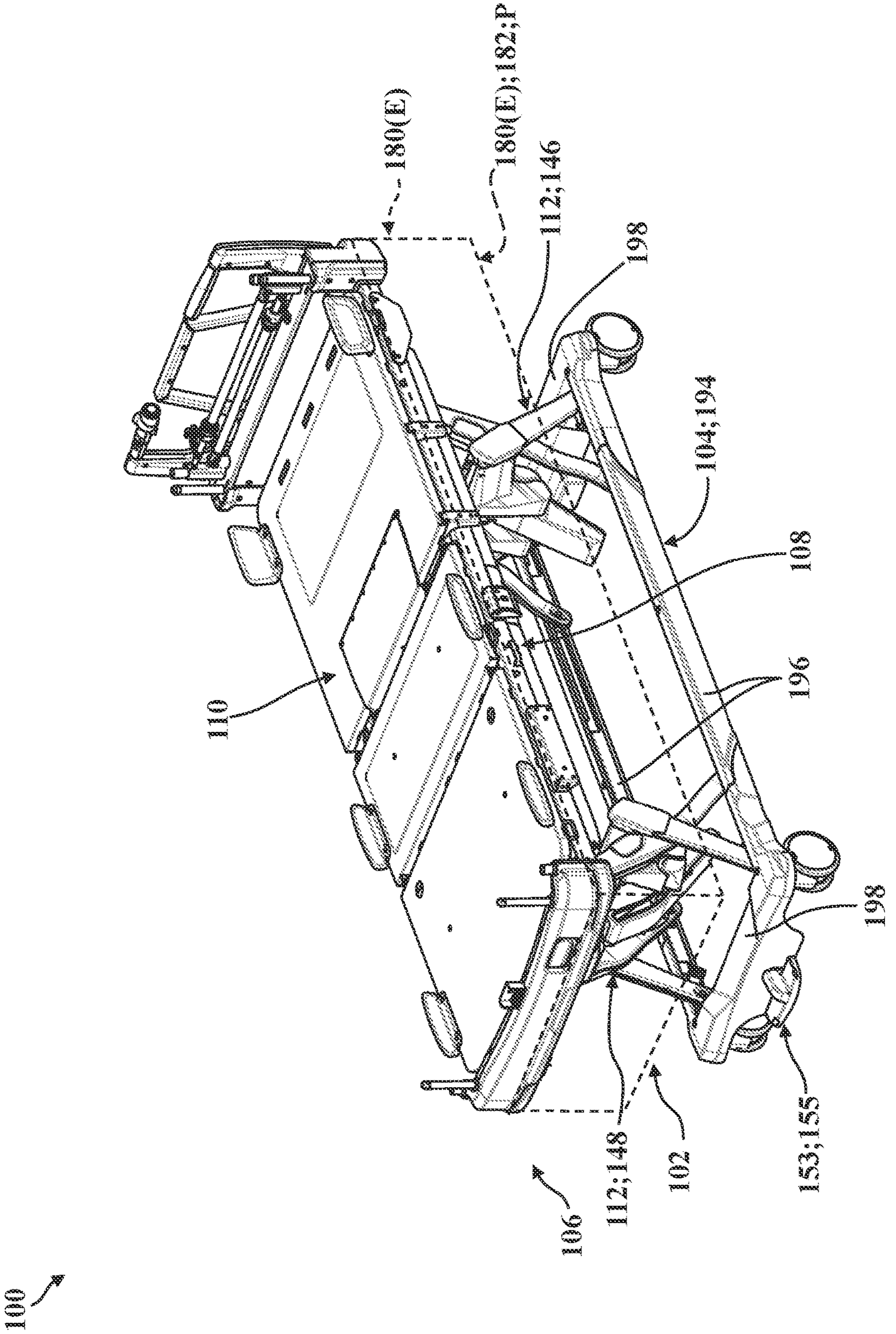
FIG. 7B is another perspective view of the patient support apparatus of FIG. 7A, shown with components removed for illustrative purposes.
Figure 7C:
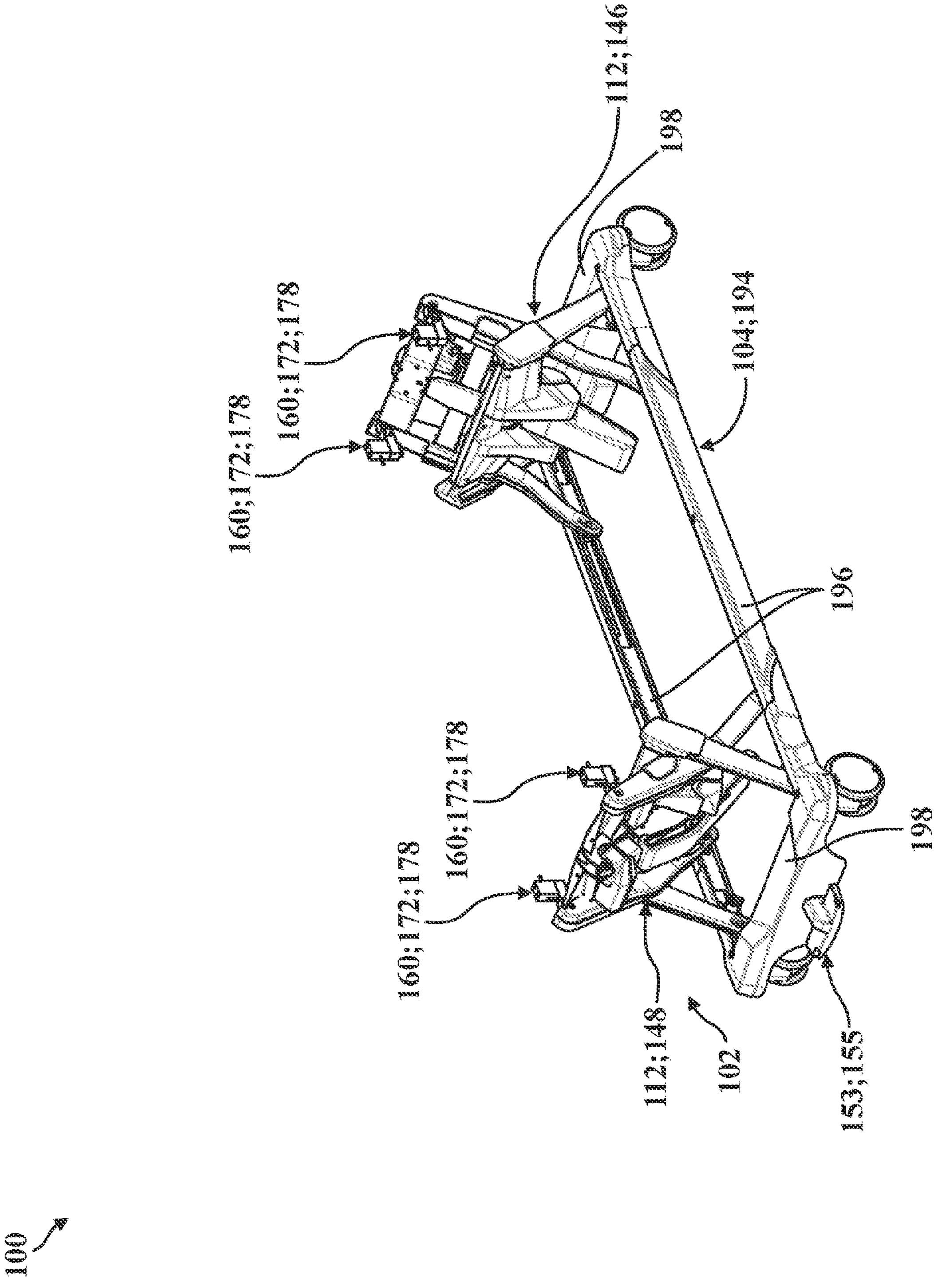
FIG. 7C is another perspective view of the patient support apparatus of FIGS. 7A-7B, shown with additional components removed for illustrative purposes.

As noted above, the patient support apparatus 100 employs the lift mechanism 112 to lift and lower the litter 106 relative to the base 104 which, in turn, moves the intermediate frame 108 together with the patient support deck 110 between various vertical configurations, such as to the raised vertical position 106A depicted in FIGS. 3A-4A, the lowered vertical position 106B depicted in FIGS. 4B-5, or to any desired vertical configuration therebetween including various inclined positions 106A such as is depicted in FIG. 6. To this end, the lift mechanism 112 may include a head end lift member 146 and a foot end lift member 148 which are each arranged to facilitate movement of the litter 106 with respect to the base 104 using one or more lift actuators 150. The lift actuators 150 may be realized as linear actuators, rotary actuators, or other types of actuators, and may be electrically operated and/or may be hydraulic. It is contemplated that, in some configurations, only one lift member and one associated lift actuator may be employed, e.g., to raise only one end of the litter 106 (see FIG. 6), or one central lift actuator to raise and lower the litter 106. The construction of the lift mechanism 112, the head end lift member 146, and/or the foot end lift member 148 may take on any known or conventional design, and is not limited to that specifically illustrated. By way of non-limiting example, the lift mechanism 112 could comprise a "scissor" linkage arranged between the base 104 and the litter 106 with one or more actuators configured to facilitate vertical movement of the patient support deck 110. In some versions, the lift mechanism 112 may be similar to as is described in U.S. Pat. No. 10,172,753, entitled "Patient Support Lift Assembly," the disclosure of which is hereby incorporated by reference in its entirety. Other configurations are contemplated.

As noted above, the patient support deck 110 is operatively attached to the intermediate frame 108 (e.g., as depicted in FIGS. 1 and 3A-6), with one or more of the deck sections 114 arranged for movement between a first section position 114A (see FIGS. 3A-4B) and a second section position 114B (see FIGS. 5-6). To this end, one or more deck actuators 152 are interposed between the deck section 114 and the intermediate frame 108 to move the deck section 114. In the representative versions illustrated herein, the deck actuator 152 is realized as a linear actuator disposed in force-translating relationship between the deck section 114 and the intermediate frame 108. More specifically, one deck actuator 152 is provided between the intermediate frame 108 and the back section 118, and another deck actuator 152 is provided between the intermediate frame 108 and the leg section 122, and each of the deck actuators 152 is arranged for independent movement to position the respective deck sections 114 to adjust the shape of the patient support surface 116 between a plurality of patient support configurations (for example, a flat configuration, a raised fowler configuration, a seated configuration, etc.). Here, the deck actuator 152 coupled to the back section 118 is configured to move the back section 118 between the first section position 114A (see FIGS. 3A-4B), the second section position 114B (see FIGS. 5-6), as well as to additional section positions between the first and second section positions 114A, 114B and/or to section positions beyond the second section position 114B.

Those having ordinary skill in the art will appreciate that the patient support apparatus 100 could employ any suitable number of deck actuators 152, of any suitable type or configuration sufficient to effect selective movement of one or more of the deck sections 114 relative to the litter 106 or other components of the support structure 102. By way of non-limiting example, the deck actuator 152 could be a linear actuator or one or more rotary actuators driven electronically and/or hydraulically, and/or controlled or driven in any suitable way. Moreover, the deck actuator 152 could be mounted, secured, coupled, or otherwise operatively attached to the intermediate frame 108 and to the deck section 114, either directly or indirectly, in any suitable way. In addition, one or more of the deck actuators 152 could be omitted for certain applications.

Referring now to FIGS. 1-6, the patient support apparatus 100 employs a control system, generally indicated at 154, to effect operation of various functions of the patient support apparatus 100, as described in greater detail below. To this end, and as is best shown schematically in FIG. 2, the control system 154 generally includes a controller 156 disposed in communication with one or more user interfaces 158 adapted for use by the patient and/or the caregiver to facilitate operation of one or more functions of the patient support apparatus 100. In certain versions, the controller 156 is also disposed in communication with the lift actuators 150, the deck actuators 152, a sensor system 160, one or more local alarms 162, one or more remote alarms 164, a communication interface 166 for communicating with a remote device 168 across a network 170, one or more sensors 172, and/or one or more load cells 178 arranged to sense force acting between the litter 106 and the base 104. It will be appreciated that other arrangements of load cells 178 are contemplated by the present disclosure, and different quantities of load cells 178 arranged in various ways may be employed by the sensor system 160. By way of non-limiting example, load cells could be interposed between the base 104 and the lift mechanism 112 (not shown). In some versions, aspects of the patient support apparatus 100, including the arrangement of load cells 178 about support structures 102, may be similar to as is described in International Patent Application Publication No. WO 2021/242946 A1, entitled "Lift Systems And Load Cells For Patient Support Apparatus;" International Patent Application Publication No. WO 2021/108377, entitled "Patient Support Apparatus With Load Cell Assemblies;" and/or U.S. Patent Application Publication No. US 2021/0030611 A1, entitled "Patient Support Apparatus With Load Cell Assemblies;" the disclosures of each of which are hereby incorporated by reference in their entirety. Other configurations are contemplated.

Figure 2:
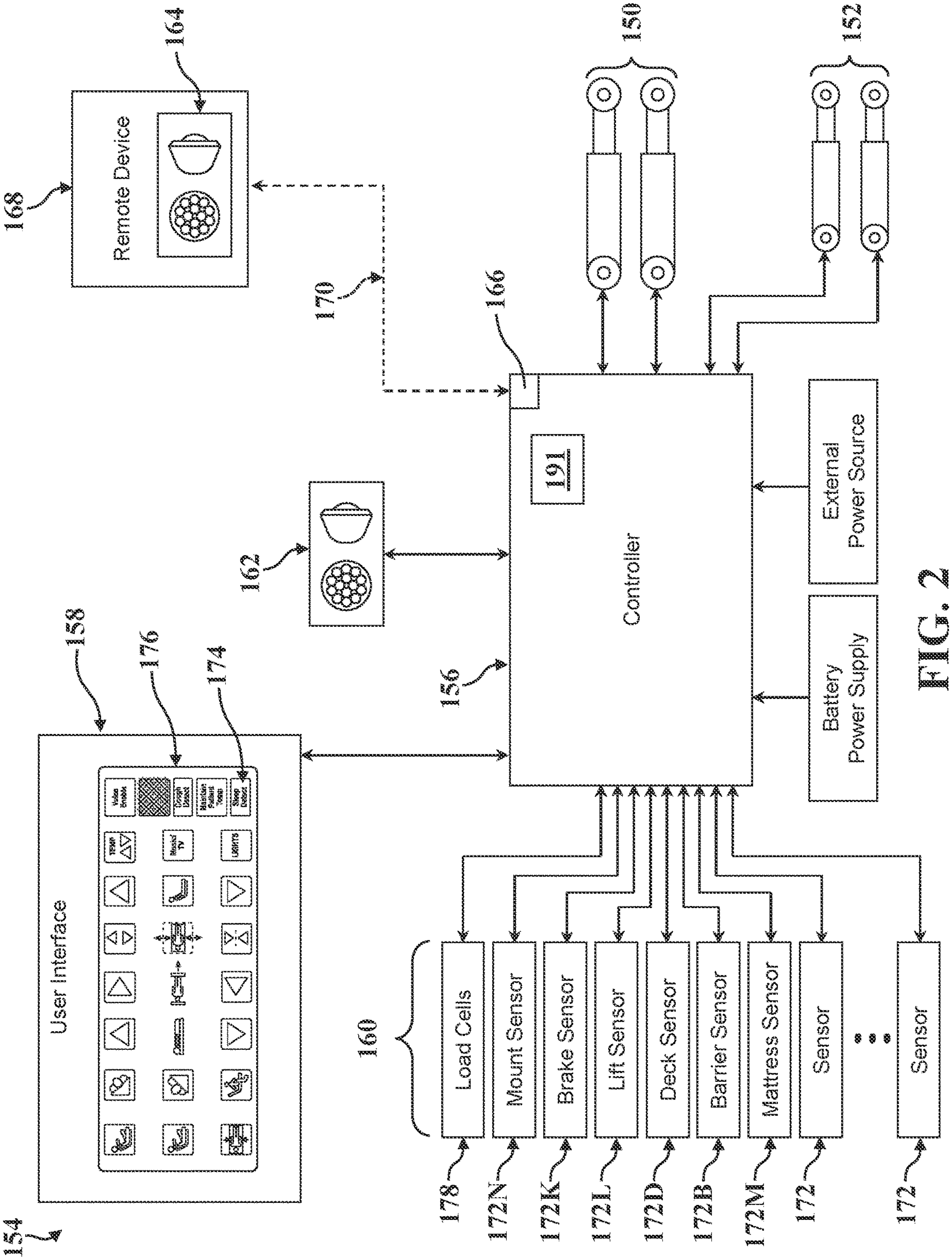
FIG. 2 is an illustrative view of a control system of the patient support apparatus of FIG. 1.

As noted above, the controller 156 is best depicted schematically FIG. 2, and has been omitted from certain drawings for the purposes of clarity and consistency. It will be appreciated that the controller 156 and/or the control system 154 can be configured or otherwise arranged in a number of different ways. The controller 156 may have one or more microprocessors for processing instructions or for processing an algorithm stored in memory to control operation of the actuators 150, 152, generation or interpretation of signals and/or data (e.g., data from sensors 172, the sensor system 160, and the like), communication with the user interfaces 158 and/or remote devices 168, and the like. Additionally or alternatively, the controller 156 may comprise one or more microcontrollers, field programmable gate arrays, systems on a chip, discrete circuitry, and/or other suitable hardware, software, or firmware that is capable of carrying out the various functions and operations described herein. The controller 156 may be carried on-board the patient support apparatus 100, such as on the base 104 or the litter 106, or may be remotely located. The controller 156 may comprise one or more sub controllers configured to control all of the actuators 150, 152 and/or user interfaces 158 or one or more subcontrollers for each actuator 150, 152 and/or user interface 158 (or other component of the patient support apparatus 100). The controller 156 may communicate with the actuators 150, 152, the user interfaces 158, and or other components of the control system 154 via wired or wireless connections.

In the representative version illustrated in FIG. 1, the patient support apparatus 100 comprises a plurality of user interfaces 158 which may be accessible by the patient, the caregiver, or by both the caregiver and the patient. Each user interface 158 of the patient support apparatus 100 generally comprises an input device 174 configured to generate an input signal in response to activation by a user which, in turn, is communicated to the controller 156. The controller 156, in turn, is responsive to the input signal and can control or otherwise carry out one or more functions of the patient support apparatus 100 in response to receiving the input signal. Put differently, the controller 156 is configured to perform a function of the patient support apparatus 100 in response to receiving the input from the input device 174. By way of non-limiting example, the input device 174 could be realized as a "lift bed" button, activation of which causes the controller 156 to drive the lift actuators 150 to move the intermediate frame 108 of the litter 106 from the maximum lowered position 106B (see FIG. 4B) vertically away from the base 104 towards the raised position 106A (see FIG. 4A). In some versions, one or more of the user interfaces 158 may also employ an output device 176, such as a screen, one or more audible and/or visual indicators (e.g., speakers, beepers, light emitting diodes LEDs, and the like), to communicate information to the user (e.g., to the caregiver). In some versions, the user interface 158 may be realized as a touchscreen interface that serves as both an input device 174 and an output device 176. In some versions, the controller 156 may be configured to facilitate navigation of visual content of the user interface 158 (e.g., realized as a graphical user interface GUI) in response to receiving the input signal from the input device 174. Thus, it will be appreciated that the user interface 158 could be configured in a number of different ways sufficient to generate the input signal. Moreover, it will be appreciated that the user interfaces 158 could be of a number of different styles, shapes, configurations, and the like. By way of non-limiting example, one or more of the user interfaces 158 may comprise buttons, indicators, screens, graphical user interfaces, and the like. Other configurations are contemplated.

Referring now, generally, to FIGS. 1-13, as noted above, the patient support apparatus 100 described and illustrated herein is configured for use in treating patients with or otherwise presenting behavioral health indicia such as, for example, those associated with an increased risk of a potential for self-harm. In particular, unsupervised patients presenting severe, suicidal behavioral health indicia may sometimes attempt to pass unauthorized objects (e.g., sheets, cords, cables, and the like) through and/or around certain portions of the patient support apparatus 100 defined as ligature risk locations (e.g., around components coupled to the support structure 102, around the 104, around the base 104, and/or other portions of the patient support apparatus 100) in an attempt to inflict self-harm. Patients presenting behavioral health indicia may also attempt to tamper with, damage, or otherwise access components of the patient support apparatus 100 which are coupled or arranged adjacent to the base 104 and/or the litter 106. In order to help ensure patient safety in these and other scenarios, the patient support apparatus 100 of the present disclosure employs a skirt barrier 180 having a bottom edge 182 and defining a periphery P. The skirt barrier 180 is operatively attached to the litter 106 for concurrent movement with the litter 106 between: an exposed configuration 180E corresponding to the raised position 106A (see FIGS. 8 and 12) and defined with the bottom edge 182 spaced vertically above the base 104, and a shield configuration 180S corresponding to the lowered position 106B (see FIGS. 9 and 13) and defined with the periphery P extending around the base 104 to at least partially limit external access to the base 104.

Figure 12:
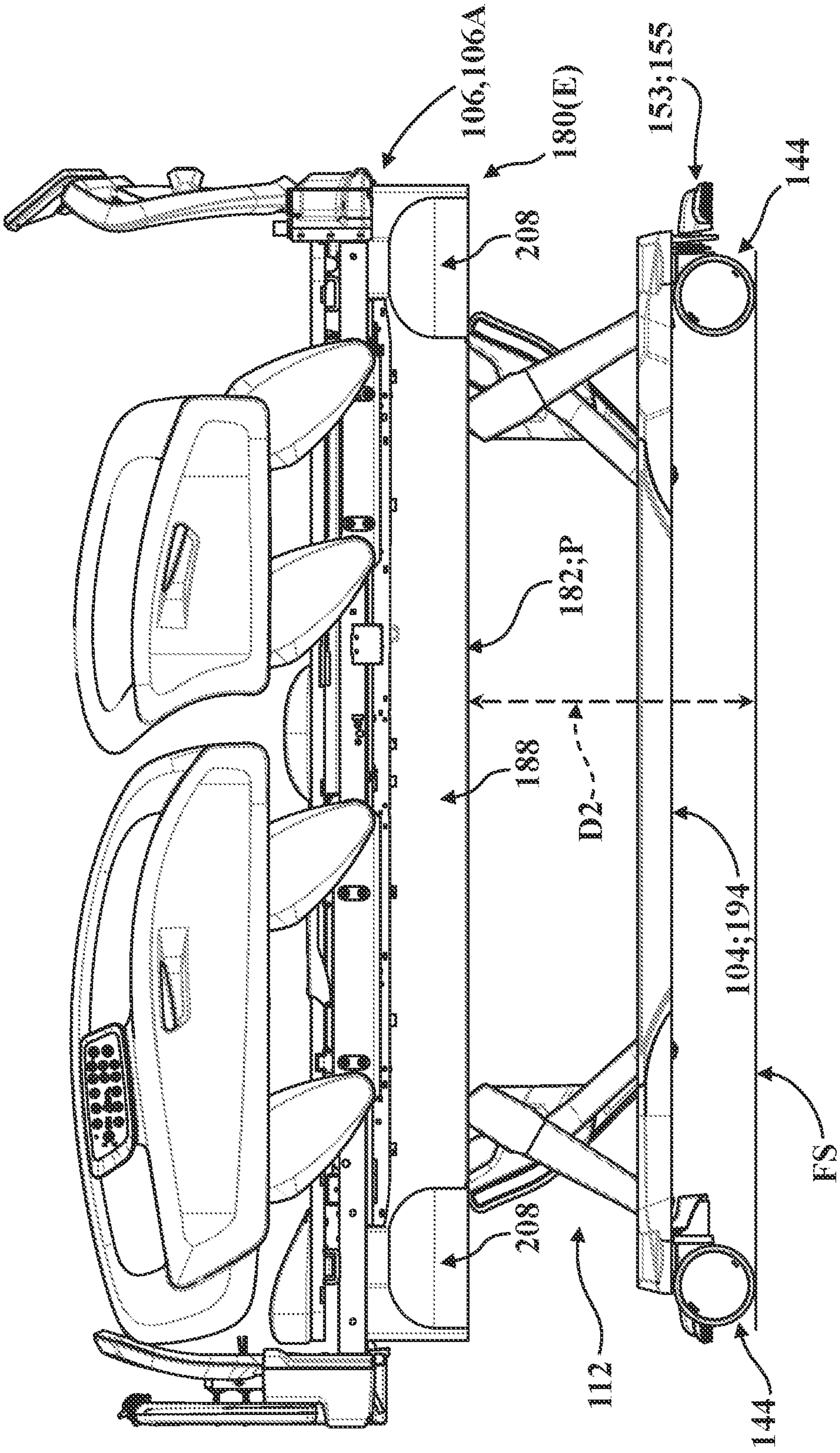
FIG. 12 is a left-side view of the patient support apparatus of FIG. 8, shown arranged in the raised position.
Figure 13:
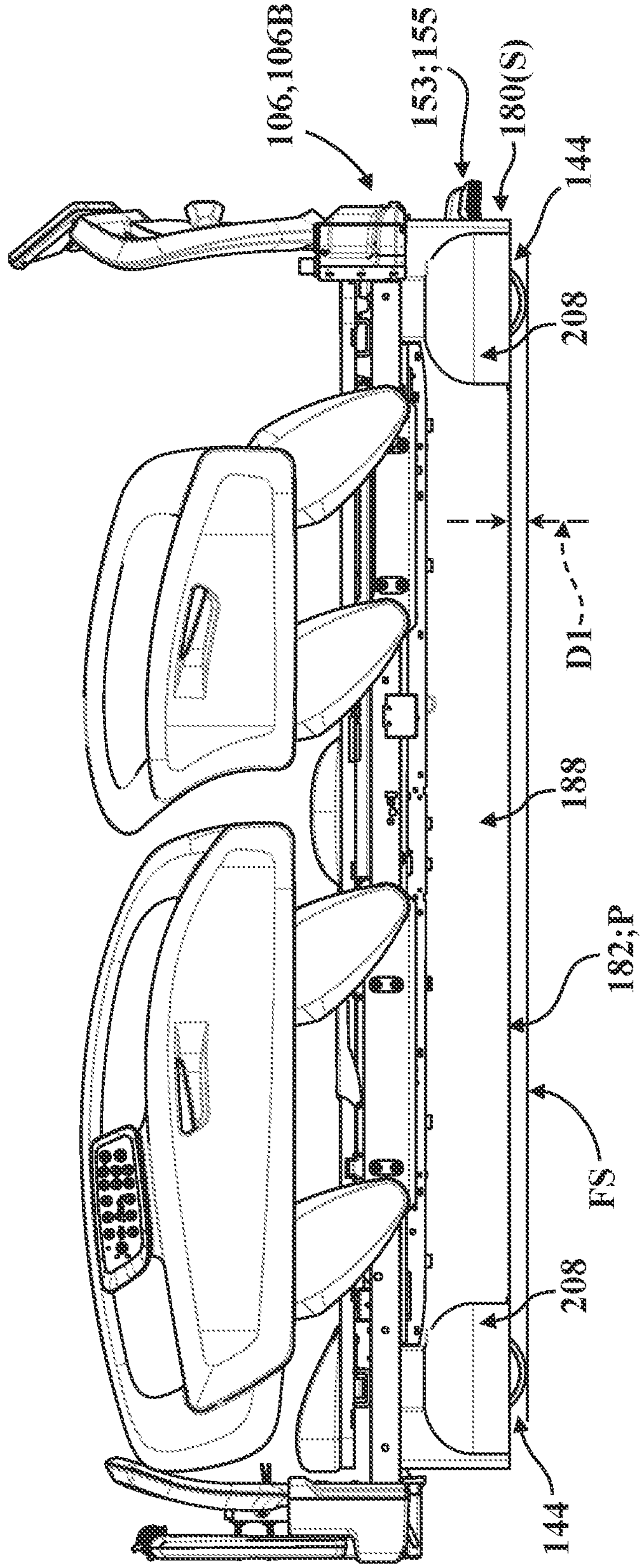
FIG. 13 is a left-side view of the patient support apparatus of FIG. 9, shown arranged in the lowered position.

During operation in the shield configuration 180S, the periphery P of the skirt barrier 180 is arranged generally parallel to the floor surface FS (see FIG. 13). During operation in the shield configuration 180S, the periphery P of the skirt barrier 180 is spaced at a first distance D1 from the floor surface FS (see FIG. 13), and at a second distance D2 during operation in the exposed configuration 180E (see FIG. 12), the second distance D2 being larger than the first distance D1.

Figure 10:
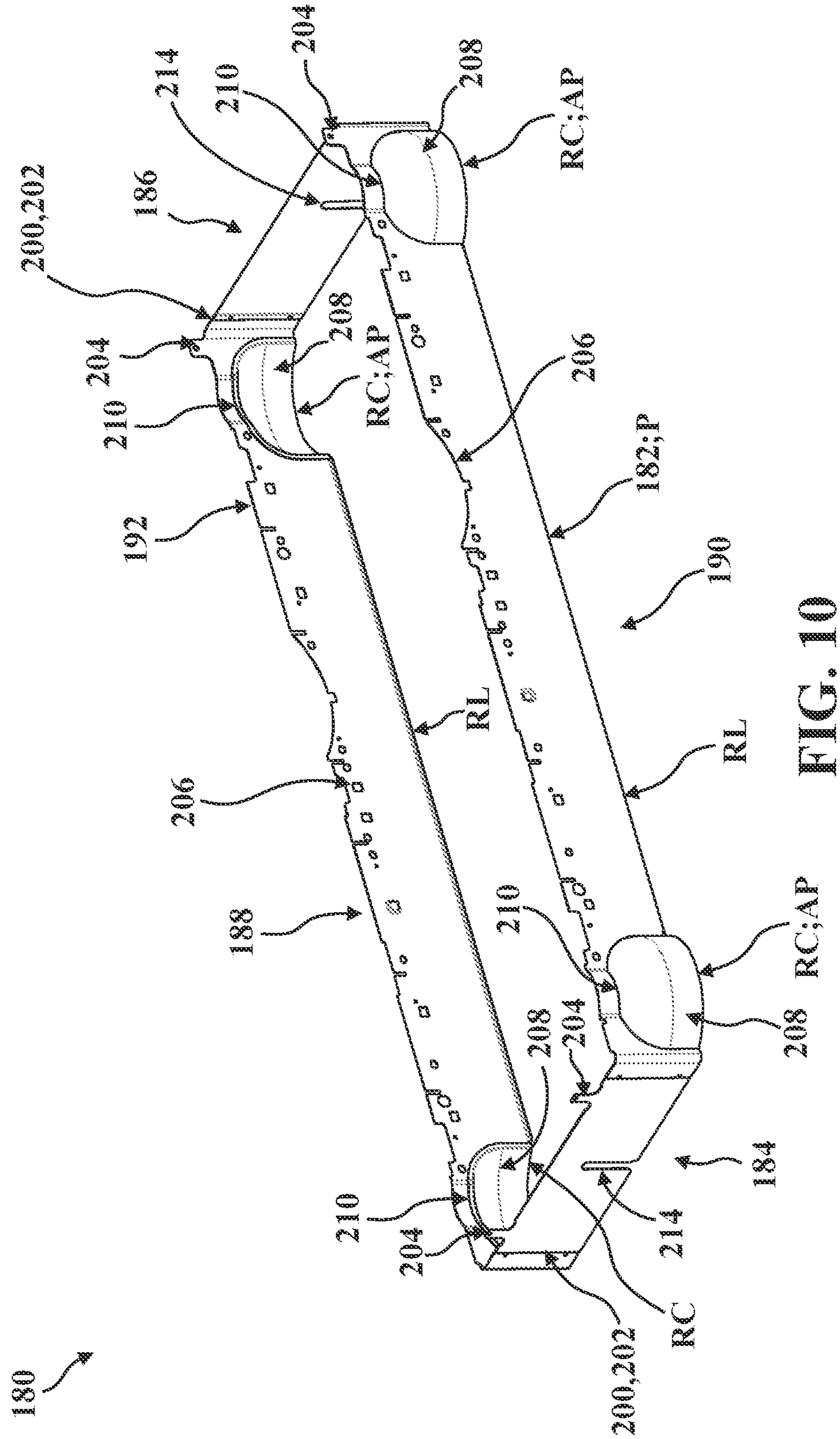
FIG. 10 is a perspective view of the skirt barrier of FIGS. 8-9.
Figure 11:
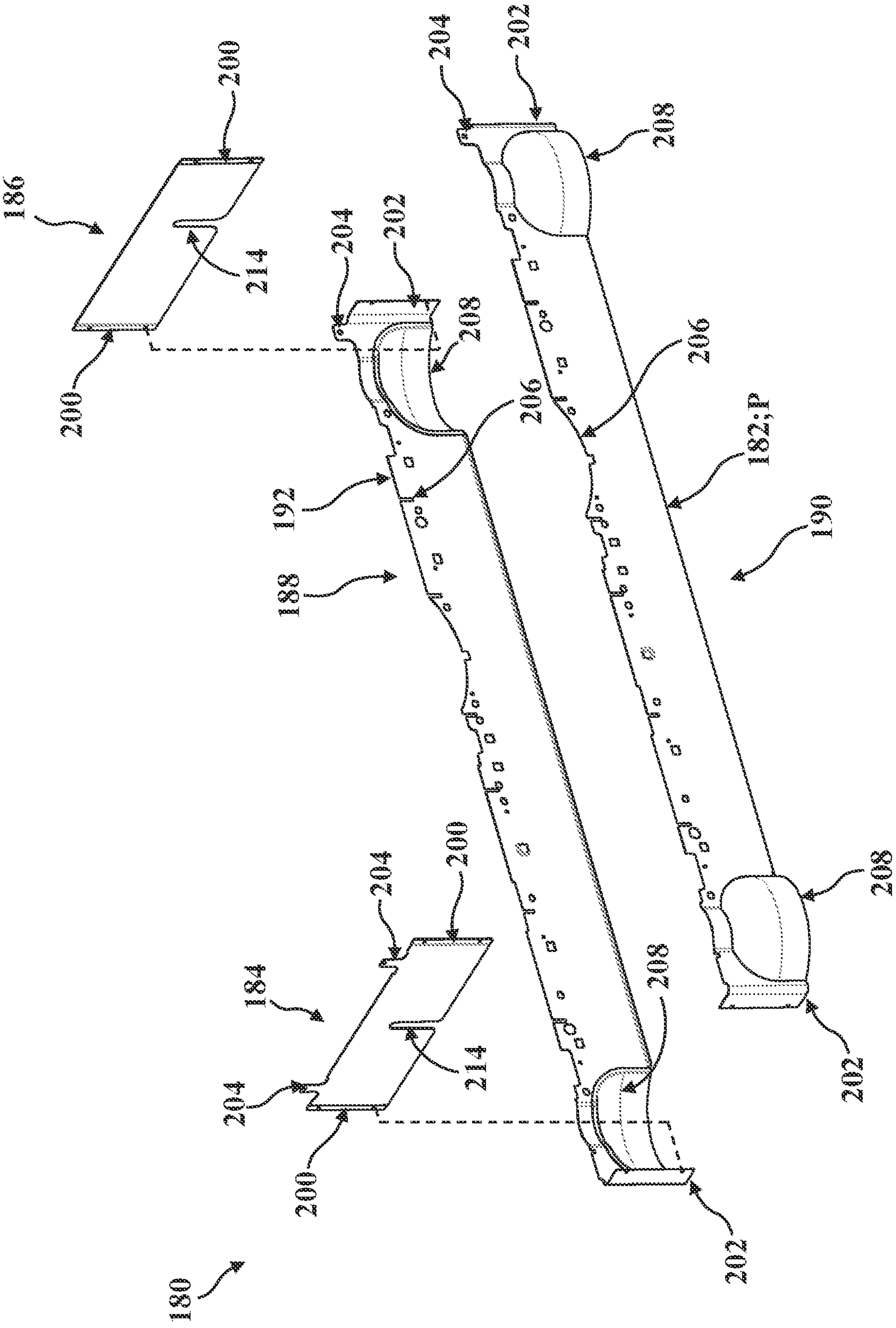
FIG. 11 is an exploded view of the skirt barrier of FIG. 10.

As is best depicted in FIGS. 10-11, the illustrated version of the skirt barrier 180 generally includes a plurality of panels 184, 186, 188, 190 which are operatively coupled to each other to define the periphery P, and which each extend between respective top edges 192 and bottom edges 182. However, as will be appreciated from the subsequent description below, the skirt barrier 180 could comprise other arrangements and/or quantities of panels 184, 186, 188, 190 to define the periphery P. In some versions, the skirt barrier 180 could employ a single component which defines the periphery (not shown). Other configurations are contemplated.

In the illustrated version, the skirt barrier 180 includes front and back panels 184, 186, and left and right panels 188, 190 which extend longitudinally between the front and back panels 184, 186. In the illustrated version, the plurality of panels 184, 186, 188, 190 includes a first pair of panels 188, 190 (or 184, 186) which are arranged substantially parallel to each other, and a second pair of panels 184, 186 (or 188, 190) which are arranged substantially perpendicular to the first pair of panels 188, 190 (or 184, 186). In the illustrated version, the base 104 includes a base frame 194 with a pair of longitudinal rails 196 and a pair of lateral rails 198, the first pair of panels 188, 190 (the left panel 188 and the right panel 190) are arranged adjacent to the longitudinal rails 196 in the shield configuration 180S (see FIG. 9; compare with FIG. 8), and the second pair of panels 184, 186 (the front panel 184 and the back panel 186) are arranged adjacent to the lateral rails 198 in the shield configuration 180S (see FIG. 9; compare with FIG. 8). As noted above, the panels 184, 186, 188, 190 are formed as separate components which are coupled together, such as via fasteners (not shown in detail), with the left panel 188 and the right panel 190 each being operatively attached to the front panel 184 and to the back panel 186. To this end, one or more of the panels 184, 186, 188, 190 defines a brace 200, and another of the panels 184, 186, 188, 190 defines a seat 202 shaped to receive and at least partially interlock with the brace 200. More specifically, the front and back panels 184, 186 each define braces 200 which are arranged to abut and overlap with seats 202 of the left and right panels 188, 190 to secure the panels 184, 186, 188, 190 together.

As noted above, the skirt barrier 180 is operatively attached to the litter 106 for concurrent movement with the litter 106 as the lift mechanism 112 moves the litter 106 from the lowered position 106B (see FIGS. 9 and 13) toward the raised position 106A (see FIGS. 8 and 12) in order to change operation from the shield configuration 180S to the exposed configuration 180E. More specifically, in the illustrated version, the intermediate frame 108 of the litter 106 supports the skirt barrier 180, which is operatively attached to the intermediate frame 108 of the litter 106 adjacent to the top edge 192. To this end, the skirt barrier 180 includes a plurality of mounting tabs 204 each extending vertically from the top edge 192 to attach to the intermediate frame 108 of the litter 106, such as via one or more fasteners (not shown). In the illustrated version, the front panel 184, the left panel 188, and the right panel 190 each include at least one mounting tab 204. However, it will be appreciated that other configurations are contemplated, and each of the panels 184, 186, 188, 190 may employ one or more mounting tabs 204 arranged to secure to the intermediate frame 108 and/or to other portions of the litter 106.

In some versions, one or more panels 184, 186, 188, 190 may include or otherwise define interface reliefs 206 of various styles, sizes, types, and arrangements, to facilitate fitment of the skirt barrier 180 with respect to other portions of the patient support apparatus 100. For example, interface reliefs 206 realized as apertures, notches, slots, holes, curved edges, and the like may be provided to route around fastening locations for other components secured to the intermediate frame 108.

During operation in the shield configuration 180S, the skirt barrier 180 at least partially limits external access to the wheels 142. Additionally, when the skirt barrier 180 is in the exposed configuration 180E, the wheels 142 are externally accessible. In the illustrated version, the left panel 188 and the right panel 190 each include a pair of fenders 208 arranged to at least partially limit external access to a respective one of the wheels 142 during operation in the shield configuration 180S (see FIGS. 9 and 13; compare with FIGS. 8 and 12). Here, the fenders 208 are shaped to permit swiveling motion of the respective caster wheel assemblies 144 during operation in the shield configuration 180S. Referring to FIG. 10, in the illustrated version, the fenders 208 each define a respective curved region RC of the periphery P, and each of the fenders 208 defines a contoured profile extending from the curved region RC to a respective fender top 210 arranged between the top edge 192 and the bottom edge 182. The left panel 188 and the right panel 190 each define a longitudinal region RL of the periphery P extending between the respective pairs of fenders 208 (more specifically, extending between the curved regions RC defined by their fenders 208). Here, the curved regions RC of the periphery P define respective apexes AP which are spaced laterally outwardly from the longitudinal regions RL of the periphery P defined by the respective panel 188, 190 (see FIG. 11). It will be appreciated that the fenders 208 afford the ability to maintain swiveling motion and rolling action of the wheels 142 of the caster wheel assemblies 144 during operation in both the exposed configuration 180E and the shield configuration 180S while, at the same time, minimizing the overall profile and size of the skirt barrier 180. However, it will be appreciated that the skirt barrier 180 could be configured differently, such as to be sized larger and without the use of discreet fenders 208. Here too, it will be appreciated that fenders 208 may be shaped or otherwise arranged in other ways about the skirt barrier 180 depending on, for example, the configuration of the base 104, the wheels 142, and/or the skirt barrier 180. Other configurations are contemplated.

As noted above, operation of the skirt barrier 180 in the shield configuration 180S helps prevent patients, including patients presenting behavioral health indicia, from tampering with, damaging, or otherwise accessing or engaging with components of the patient support apparatus 100 which are coupled or arranged adjacent to the base 104 and/or the litter 106. By way of non-limiting example, because the deck actuators 152 are arranged on the underside of the litter 106 and are positioned adjacent to the base 104 in the lowered position 106B, the skirt barrier 180 at least partially limits external access to one or more of the deck actuators 152 during operation in the shield configuration 180S (see FIG. 4B; depicted schematically). Here too, because the lift mechanism 112 is interposed between the litter 106 and the base 104, the skirt barrier 180 at least partially limits external access to one or more of the lift actuators 150 and/or other components of the lift mechanism 112 during operation in the shield configuration 180S (see FIG. 4B; depicted schematically).

Figure 8:
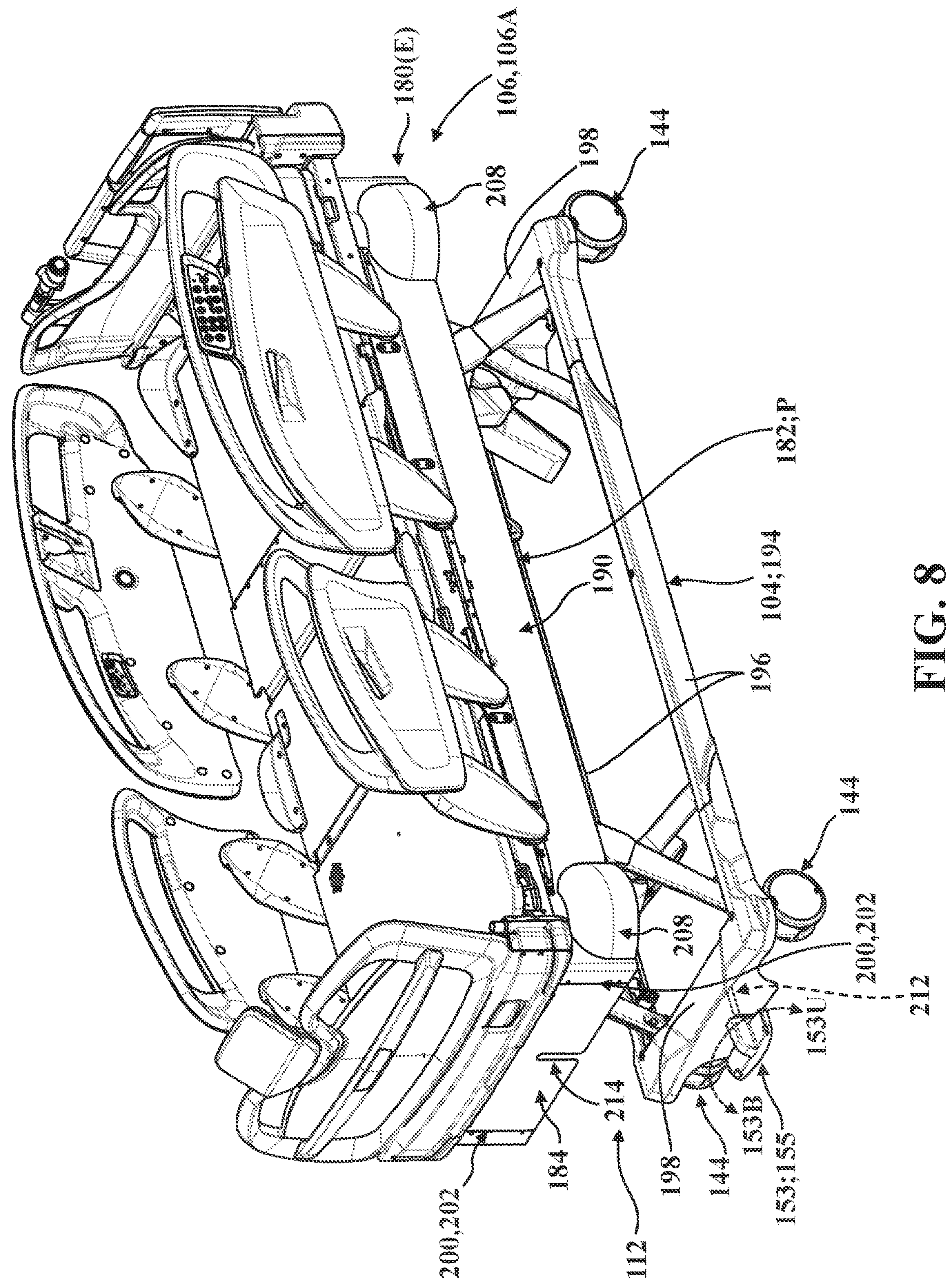
FIG. 8 is a perspective view of another version of the patient support apparatus of FIGS. 1-7C, shown with a skirt barrier coupled to a litter arranged in a raised position arranged vertically above a base.
Figure 9:
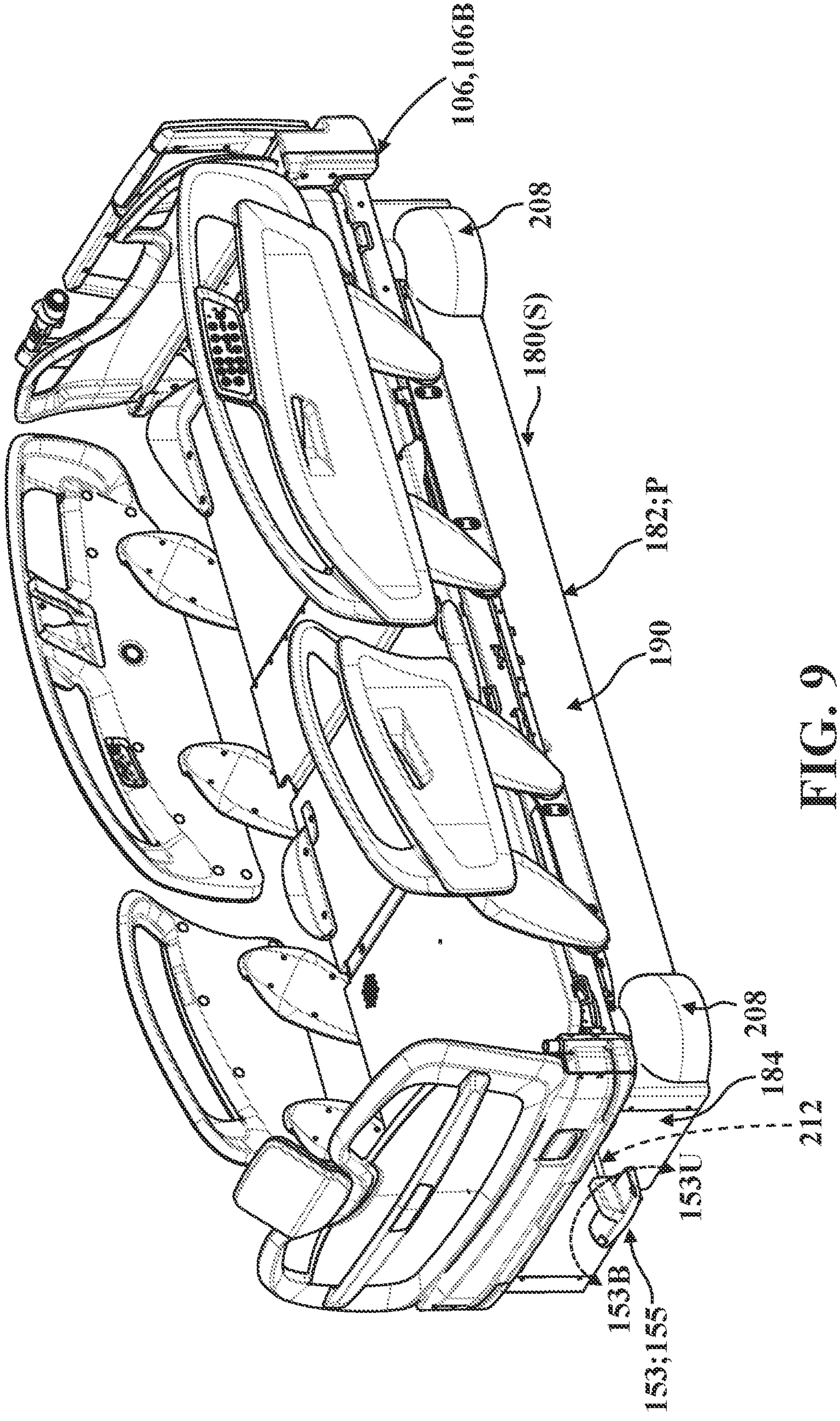
FIG. 9 is another perspective view of the patient support apparatus of FIG. 8, shown with the litter and the skirt barrier arranged in a lowered position with the skirt barrier surrounding the base.

In the illustrated version, and as is depicted schematically in FIGS. 8-9, the skirt barrier 180 is configured to limit external access to at least a portion of the brake assembly 153 during operation in the shield configuration 180S while, at the same time, permitting user access to the brake pedal 155 in both the shield configuration 180S and the exposed configuration 180E to facilitate changing between the braked state 153B and the unbraked state 153U (not shown in detail). To this end, the brake assembly 153 includes a shaft 212 pivotably coupled to the base frame 194 of the base 104 and supporting the brake pedal 155, and the skirt barrier 180 defines a slot 214 extending vertically from the bottom edge 182 and arranged to receive the shaft 212 of the brake assembly 153 between the base frame 194 and the brake pedal 155 during operation in the shield configuration 180S to enable user engagement with the brake pedal 155 outside of the skirt barrier 180 in the shield configuration 180S (see FIG. 8). As shown in FIG. 9, the slot 214 of the skirt barrier 180 is spaced vertically above the shaft 212 of the brake assembly 153 during operation in the exposed configuration 180E.

It will be appreciated that various arrangements of panels 184, 186, 188, 190 are contemplated, and the skirt barrier may include fewer than four panels (e.g., a single panel that extends around or otherwise surrounds the base 104 in the lowered position 106B) or more than four panels. Moreover, it will be appreciated that panels may interlock or connect with each other and/or with portions of the litter 106 or other components of the patient support apparatus 100 to define the skirt barrier 180. In some versions, panels may not be coupled to each other, but may instead be separately coupled to the litter 106. Other configurations are contemplated.

As noted above, the skirt barrier 180 surrounds the base 104, the wheels 142, and other components coupled to the base 104, as well as other portions of the litter 106 and other portions of the patient support apparatus 100 (e.g., the lift mechanism 112), when the litter 106 moves to the lowered position 106B to effect operation in the shield configuration 180S (see FIGS. 9 and 13; compare to FIGS. 8 and 12). It will be appreciated that this configuration affords significant advantages for improved safety of patients presenting behavioral health indicia, whereby patient access to components beneath the litter 106 is substantially inhibited. Put differently, when the litter 106 is in the lowered position

106B, the skirt barrier 180 helps prevent the patient from tampering with (or attempting to inflict self-harm with), damaging, or otherwise accessing any components of the base 104, the lift mechanism, or the litter 106 that are concealed by the skirt barrier 180 in the shield configuration 180S.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus for use in treating patients with behavioral health indicia, the patient support apparatus comprising:

a base supporting a plurality of wheels arranged for movement along a floor surface;

a shaft pivotably coupled to the base and supporting a pedal for user engagement;

a litter for supporting a patient;

a lift mechanism interposed between the litter and the base to move the litter relative to the base between a lowered position and a raised position; and a skirt barrier having a bottom edge defining a periphery, with a slot defined extending vertically from the bottom edge, the skirt barrier being operatively attached to the litter for concurrent movement with the litter between:

an exposed configuration corresponding to the raised position and defined with the bottom edge spaced vertically above the base, and a shield configuration corresponding to the lowered position and defined with the bottom edge arranged adjacent to the floor surface and with the periphery extending around the base to at least partially limit external access to the base, with the slot arranged to receive the shaft between the base and the pedal to enable user engagement with the pedal outside of the skirt barrier in the shield configuration.

2. The patient support apparatus of claim 1, wherein the periphery of the skirt barrier is arranged generally parallel to the floor surface in the shield configuration.

3. The patient support apparatus of claim 1, wherein the skirt barrier includes a plurality of panels operatively coupled to each other to define the periphery.

4. The patient support apparatus of claim 3, wherein one of the plurality of panels defines a brace; and wherein another one of the plurality of panels defines a seat shaped to receive and at least partially interlock with the brace.

5. The patient support apparatus of claim 3, wherein the plurality of panels includes a first pair of panels arranged substantially parallel to each other.

6. The patient support apparatus of claim 5, wherein the plurality of panels includes a second pair of panels arranged substantially perpendicular to the first pair of panels.

7. The patient support apparatus of claim 6, wherein the base includes a pair of longitudinal rails and a pair of lateral rails;

wherein the first pair of panels are arranged adjacent to the longitudinal rails in the shield configuration; and wherein the second pair of panels are arranged adjacent to the lateral rails in the shield configuration.

8. The patient support apparatus of claim 6, wherein the first pair of panels are further defined as a left panel and a right panel; and wherein the second pair of panels are further defined as a front panel and a back panel.

9. The patient support apparatus of claim 8, wherein the left panel and the right panel are each operatively attached to the front panel and to the back panel.

10. The patient support apparatus of claim 8, wherein the left panel and the right panel each include a pair of fenders, with each of the fenders arranged to at least partially limit external access to a respective one of the plurality of wheels in the shield configuration.

11. The patient support apparatus of claim 10, wherein the plurality of wheels are further defined as caster wheel assemblies each supporting a respective wheel for swiveling motion; and wherein each of the fenders are shaped to permit swiveling motion of the respective caster wheel assemblies in the shield configuration.

12. The patient support apparatus of claim 10, wherein each of the fenders defines a respective curved region of the periphery.

13. The patient support apparatus of claim 12, wherein the left panel and the right panel each define a top edge spaced from the bottom edge; and wherein the fenders each define a contoured profile extending from the curved region to a respective fender top arranged between the top edge and the bottom edge.

14. The patient support apparatus of claim 13, wherein the left panel and the right panel each define a longitudinal region of the periphery extending between the respective pairs of fenders; and wherein the curved regions of the periphery define respective apexes spaced laterally from the longitudinal regions of the periphery.

15. The patient support apparatus of claim 1, wherein the litter includes: one or more deck sections defining a patient support deck; and an intermediate frame interposed between the one or more deck sections and the lift mechanism, the intermediate frame supporting the skirt barrier.

16. The patient support apparatus of claim 15, wherein the skirt barrier defines a top edge spaced from the bottom edge, with the skirt barrier operatively attached to the intermediate frame of the litter adjacent to the top edge.

17. The patient support apparatus of claim 15, further comprising one or more deck actuators interposed between the patient support deck and the intermediate frame to adjust the patient support deck; and wherein the skirt barrier at least partially limits external access to the one or more deck actuators in the shield configuration.

18. The patient support apparatus of claim 1, wherein the pedal is further defined as a brake pedal; and further comprising a brake assembly supported by the base and operatively attached to one or more of the plurality of wheels, the brake assembly including the brake pedal, with the brake pedal being arranged for user engagement between:

a braked state to inhibit movement of the base along the floor surface, and an unbraked state to permit movement of the base along the floor surface; and wherein the skirt barrier limits external access to at least a portion of the brake assembly in the shield configuration.

19. The patient support apparatus of claim 18, wherein the base includes a base frame; and wherein the brake assembly includes the shaft, with the shaft being pivotably coupled to the base frame.

20. A patient support apparatus for use in treating patients with behavioral health indicia, the patient support apparatus comprising:

a base including a base frame and supporting a plurality of wheels arranged for movement along a floor surface;

a brake assembly supported by the base and operatively attached to one or more of the plurality of wheels, the brake assembly including a shaft pivotably coupled to the base frame and supporting a brake pedal arranged for user engagement between:

a braked state to inhibit movement of the base along the floor surface, and an unbraked state to permit movement of the base along the floor surface;

a litter for supporting a patient;

a lift mechanism interposed between the litter and the base to move the litter relative to the base between a lowered position and a raised position; and a skirt barrier having a bottom edge defining a periphery, with a slot defined extending vertically from the bottom edge, the skirt barrier being operatively attached to the litter for concurrent movement with the litter between:

an exposed configuration corresponding to the raised position and defined with the bottom edge spaced vertically above the base, and a shield configuration corresponding to the lowered position and defined with the bottom edge arranged adjacent to the floor surface and with the periphery extending around the base to at least partially limit external access to the base and at least a portion of the brake assembly, with the slot arranged to receive the shaft of the brake assembly between the base frame and the brake pedal to enable user engagement with the brake pedal outside of the skirt barrier in the shield configuration.

* * * * *